(12) United States Patent
Caspi et al.

(10) Patent No.: US 8,032,622 B2
(45) Date of Patent: Oct. 4, 2011

(54) SYSTEM AND METHOD FOR SOCIAL-NETWORKING BASED PRESENCE

(75) Inventors: Rami Caspi, Sunnyvale, CA (US); William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 488 days.

(21) Appl. No.: 11/726,018

(22) Filed: Mar. 20, 2007

(65) Prior Publication Data

US 2008/0235349 A1 Sep. 25, 2008

(51) Int. Cl.
*G06F 15/16* (2006.01)
*G06F 15/173* (2006.01)

(52) U.S. Cl. ........................................ 709/223; 709/218
(58) Field of Classification Search .................. 709/218, 709/223
See application file for complete search history.

(56) References Cited

U.S. PATENT DOCUMENTS

| 7,689,682 | B1 * | 3/2010 | Eldering et al. ............... 709/223 |
| 7,801,956 | B1 * | 9/2010 | Cumberbatch et al. ....... 709/204 |
| 7,822,822 | B2 * | 10/2010 | Sanghavi ...................... 709/206 |
| 2003/0126250 | A1 * | 7/2003 | Jhanji ............................ 709/223 |
| 2003/0208545 | A1 * | 11/2003 | Eaton et al. ................... 709/206 |
| 2005/0038876 | A1 * | 2/2005 | Chaudhuri .................... 709/219 |
| 2006/0123084 | A1 * | 6/2006 | Heidloff et al. ................ 709/206 |
| 2006/0248185 | A1 * | 11/2006 | Morris ........................... 709/224 |
| 2007/0156805 | A1 * | 7/2007 | Bristol et al. .................. 709/202 |
| 2007/0201482 | A1 * | 8/2007 | Kharebov et al. ............. 370/395.2 |
| 2008/0045236 | A1 * | 2/2008 | Nahon et al. .................. 455/456.1 |
| 2008/0098313 | A1 * | 4/2008 | Pollack .......................... 715/753 |
| 2008/0126476 | A1 * | 5/2008 | Nicholas et al. .............. 709/203 |
| 2008/0140650 | A1 * | 6/2008 | Stackpole ........................... 707/5 |
| 2008/0155020 | A1 * | 6/2008 | Beauchamp et al. .......... 709/204 |
| 2008/0222295 | A1 * | 9/2008 | Robinson et al. ............. 709/227 |
| 2009/0019004 | A1 * | 1/2009 | Abhyanker ....................... 707/3 |
| 2009/0054039 | A1 * | 2/2009 | van Wijk et al. .............. 455/412.1 |
| 2010/0017371 | A1 * | 1/2010 | Whalin et al. ..................... 707/3 |
| 2010/0205605 | A1 * | 8/2010 | Johnson et al. ................ 718/102 |
| 2010/0306119 | A1 * | 12/2010 | Banerjee et al. ............... 705/319 |

* cited by examiner

*Primary Examiner* — John Follansbee
*Assistant Examiner* — Imad Hussain

(57) ABSTRACT

A telecommunications system includes a network; a social networking service operably coupled to the network and configured to allow registration of users, to allow identification of registered users' interests, and to identify associated users, said associated users being associated with registered users; a presence service operably coupled to the network and configured to determine an availability of associated users responsive to one or more availability criteria; a translation unit configured to convert user information from a social networking service format to a presence service format; and a messaging service operably coupled to the network and configured to send notification messages to associated users determined to be available and having a common interest corresponding to an event responsive to an occurrence of the event and one or more availability criteria.

20 Claims, 8 Drawing Sheets

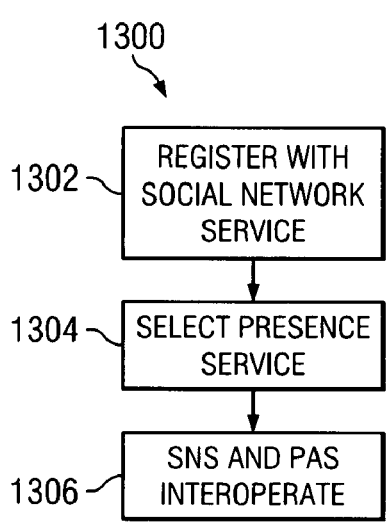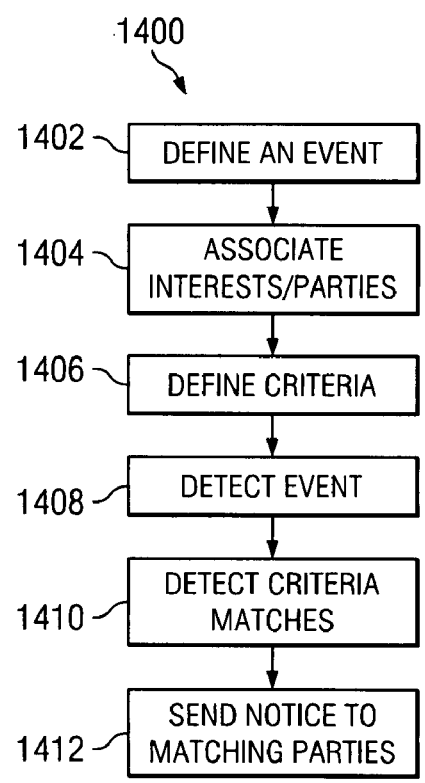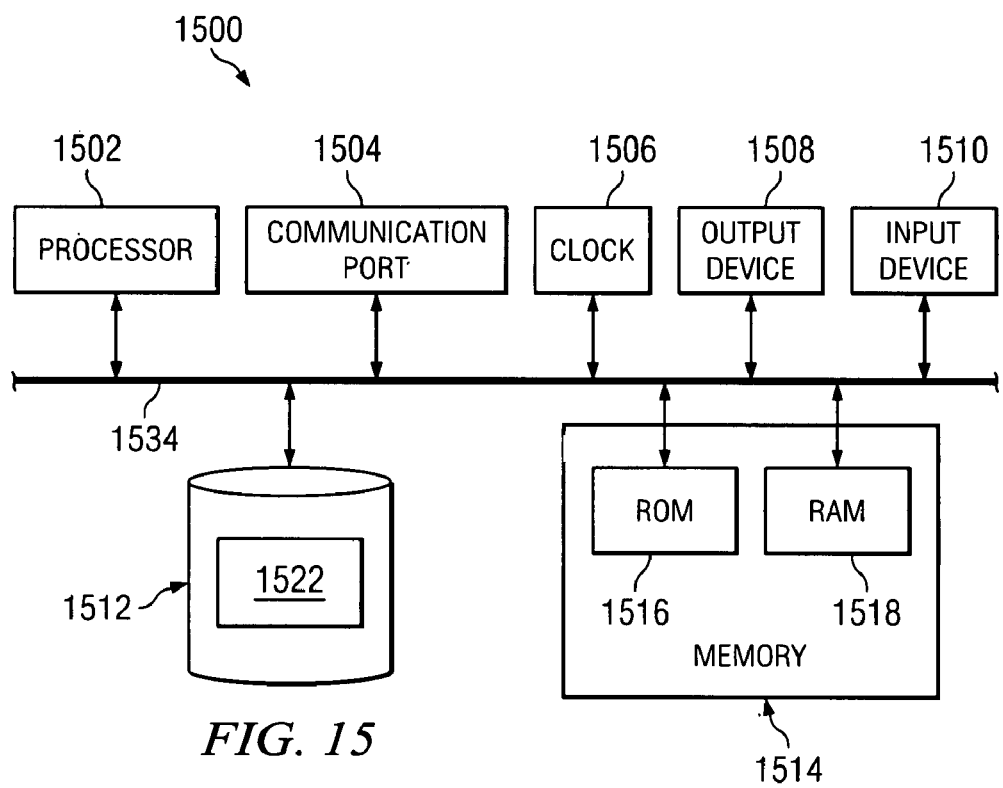

SYSTEM AND METHOD FOR SOCIAL-NETWORKING BASED PRESENCE

BACKGROUND OF THE INVENTION

1. Field of the Invention

This invention relates social networking services. More particularly, the invention relates to systems and methods for incorporating user presence and location into a social networking service.

2. Description of the Related Art

Social networking services, such as MySpace and Friendster, are becoming increasingly popular. Such systems typically provide a World Wide Web page interface and allow users to establish personal social network accounts, which allow access to a variety of services. These services include personal blogs, identification of interests, and can include access to instant messaging and e-mail services. Such systems can further maintain databases of registered parties having common interests.

In addition, such systems allow other users to register as "friends," with their accounts. Such systems may further allow an identification of when a "friend" is online, thereby facilitating instant messaging or other social interaction. For example, friends can receive notification when a party has updated his blog.

Other systems, known as "presence systems," such as Instant Messaging systems, allow users to define sets of "contacts" or "buddies," whose "presence status" or user or device context, may be monitored and reported to other registered users. For example, a user may be reported to be "on line" or "at the office," and the like.

In general, social networking services and presence systems are distinct, in that each system is independent and requires an independent account setup and separate lists of "friends" and "contacts." Thus, unless the friends and contacts lists are deliberately set up to be identical, and continually maintained as such, the full set of services is never available to a given user.

U.S. Pat. No. 6,968,179 provides a system in which users can track the availability of other users and generate notifications based upon user set parameters, so as to facilitate social interactions. Nevertheless, to properly exploit such a system, a legacy user would need to completely migrate thereto (thereby abandoning his installed base) or maintain a third communication system.

Thus, neither the presence nor social interaction art provides a system in which presence and social networking are available to users using independent and/or legacy social networking and presence systems.

SUMMARY OF THE INVENTION

These and other disadvantages in the prior art are overcome in large part by systems and methods according to embodiments of the present invention.

Embodiments of the present invention relate to a presence and positioning service that communicates with an independent social networking service to provide enhanced social networking services. A social networking service user may register with the social networking service and maintain one or more lists or groups of "friends" and common interests. The lists of friends are received by and are treated in the presence and positioning service as system "contacts." The presence and positioning service can maintain presence and place contextual contact information for the contacts. A user can then set or select an event using the social networking service and notifications or alerts can be sent to the user's contacts using one or more criteria in the presence and positioning service. In some embodiments, the criteria for notification are based on an analysis of the contact's interests and the contact's availability. In some embodiments, this analysis includes a determination of the contact's proximity to the event.

In some embodiments, the "friends" in the social networking service are uploaded to the presence and positioning system and treated as contacts for a "dummy" user in the presence and positioning system. A translation unit maintains a record of which contacts correspond to which friends. In other embodiments, users in the social networking service are uploaded to the presence and positioning system as "native" users, with their friends being considered contacts in the presence and positioning system. The translation unit maintains a record of which users are dual users.

A telecommunications system in accordance with embodiments of the present invention includes a network; a social networking service operably coupled to the network and configured to allow registration of users, to allow identification of registered users' interests, and to identify associated users, said associated users being associated with registered users; a presence service operably coupled to the network and configured to determine an availability of associated users responsive to one or more availability criteria; a translation unit configured to convert user information from a social networking service format to a presence service format; and a messaging service operably coupled to the network and configured to send notification messages to associated users determined to be available and having a common interest corresponding to an event responsive to an occurrence of the event and one or more availability criteria. In addition, depending on the embodiment, user information from one service may be converted into "dummy" user information in the other; or user entries from one service may be converted into corresponding user entries in the other.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 13 is a flowchart illustrating operation of an embodiment of the present invention.

FIG. 14 is a flowchart illustrating operation of an embodiment of the present invention.

FIG. 15 is an exemplary device implementing aspects of the present invention.

DETAILED DESCRIPTION OF EMBODIMENTS OF THE INVENTION

Figure 1:
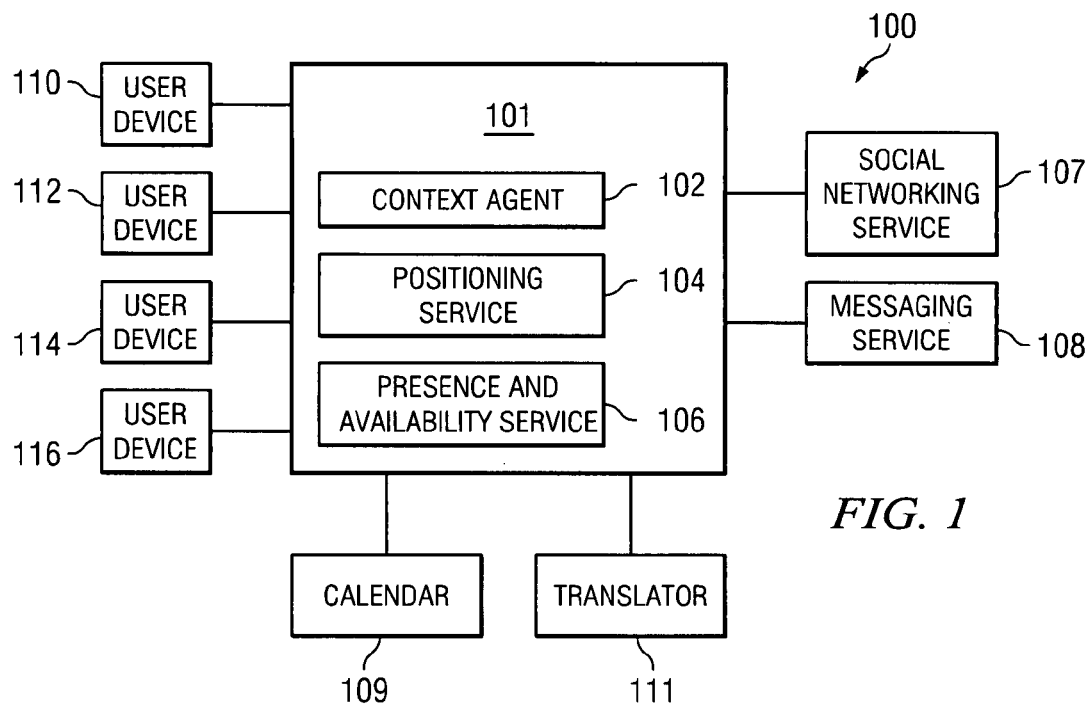
FIG. 1 illustrates an exemplary system according to an embodiment of the present invention.

Turning now to the drawings and, with particular attention to FIG. 1, a diagram of a telecommunications system 100 according to an embodiment of the present invention is shown. The system includes a user presence service 101 connected to or in communication with a messaging service 108 and a social networking service 107, and may further include a calendar service 109 and translation unit 111. The user presence service 101 may include a presence and availability service (PAS) 106, a context agent 102, and a positioning service 104. The telecommunications service 101 thus may track users and maintain one or more databases (not shown) of their contact information and locations.

The positioning service 104 may receive location information associated with a user or user device and can interact with the context agent 102 and presence and availability service 106 to define user or device contexts based upon a determination of the user or device location. The positioning service 104 may be implemented in association with a global positioning system (GPS) or other system for identifying the device or user location.

The presence and availability service 106 may be embodied as a service that monitors user or device states for whether the user or device is present or available for contacting via a particular medium. The context agent 102 receives presence or availability information from the presence and availability service 106, can receive positioning information from the positioning service 104, and identifies from the particular presence and/or positioning information the associated user or device context, as will be explained in greater detail below. The context agent 102 may thus include an inference engine that infers from this information an availability or contact information for the user.

The messaging service 108 may be embodied as an electronic messaging system, such as e-mail or text messaging systems, such as an instant messaging service. Exemplary instant messaging services include MSN Messenger, AOL Instant Messenger, and Yahoo Messenger.

The social networking service 107 may be an Internet-based social networking service, such as Friendster or MySpace. The calendar service 109 may be implemented as a web or network based calendar service such as, for example, Microsoft Outlook Express.

The translation unit 111 may be a server-based application and may be operable in accordance with embodiments of the present invention to translate or otherwise convey user information from a format compatible with the social networking service 107 to the presence and availability service 106, and vice versa.

User devices, such as user devices 110, 112, 114, 116 may be coupled to or in communication with the service 101 and the messaging 108, social networking 107, and calendar 109 services. In certain embodiments, the user devices 110, 112, 114, 116 may be implemented as portable electronic communication devices, such as cellular telephones or laptop computers.

User devices implemented as portable electronic communication devices may be equipped with presence controls, i.e., a software and/or firmware application for processing presence information, for receiving presence information, as well as positioning information, as will be explained in greater detail below. In some embodiments, the user devices may further include social networking controls. i.e., a software and/or firmware application for processing social networking service information. In some embodiments, the presence controls and social networking controls can include a browser type interface.

In accordance with embodiments of the present invention, as will be explained in greater detail below, "friends" in a social networking service 107 may be contacted or notified via the presence and availability service 106 when an event of mutual interest is about to occur, and in some embodiments, when sufficient parties are within a predetermined proximity to a location of the event.

In certain embodiments, the system 100 may also include other hardware and/or software components (e.g., gateways, proxy servers, registration server, presence servers, redirect servers, databases, applications, etc.) such as, for example, hardware and software used to support a SIP (Session Initiation Protocol) or other protocol based infrastructure for the system 100 and allow the registration of SIP devices in the system 100.

The context agent 102 may monitor the identity context of one or more identities or the device contexts of one or more devices based upon presence and availability information received from the presence and availability service 106. The context agent 102 may provide or include an application interface that supports identity context, device context, device presence, and/or other functions. Applications may monitor, access, and/or query the context agent 102 for presence states, i.e., user availability, and/or device context information. The context agent 102 may be implemented in hardware and/or software operating on one or more servers, computer systems, host or mainframe computers, workstations, etc. In some embodiments, the context agent 102 may be operating on some or all of the same devices as other components in the system 100.

In some embodiments, exemplary contexts could be a state of "in meeting," "on vacation," "in the office," "out of the office," "roaming," "offline," "online," "unknown," "on business trip," "in transit," "mobile," "busy," etc. Thus, the context describes the implied availability of the user. In some embodiments, different applications may be used to set, monitor or change an user context for a user. For example, a calendar program, telephone user interface, graphical user interface, plug-in, etc. may allow or enable an identity to set or change a presence context for the user manually or automatically.

The presence and availability service (PAS) 106 may be or include an application that monitors the presence and availability of devices. That is, the PAS 106 monitors the states of one or more users or devices. The context agent 102 then "translates" the states into the context information, i.e., it infers from the states a given context or availability. In some embodiments, one or more of the devices may be associated with identities whose contexts may be used or monitored by the various applications. The PAS 106 may be implemented in hardware and/or software operating on one or more servers, computer systems, host or mainframe computers, workstations, etc. In some embodiments, the PAS 106 may be operating on some or all of the same devices as other components in the system 100.

In some embodiments, the PAS 106 may be or include an application that communicates with or is connected to one or more registered devices (e.g., devices 110, 112, 114, 116) that allows devices to register with the system 100 or helps to facilitate their registration. For example, in a SIP environment, the devices 110, 112, 114, 116 may be registered with the system 100 and may show up or be described in registration databases as being assigned to particular identities. The context agent 102 may register with the PAS 106 and receive device context and/or information from the PAS 106 regarding the devices 110, 112, 114, 116. In some embodiments, the PAS 106 may provide context information to applications upon request, periodically or in accordance with some other plan or procedure.

The calendar service 109 may be any application that allows a user to enter events, etc., for keeping track of a schedule. In some embodiments, the calendar service 109 is a network based calendar service, such as Microsoft Outlook Express. The calendar service 109 may be accessible or communicate with other components of the system, as will be explained in greater detail below. For example, users of the presence and availability service 106 may be able to enter appointments and schedule and define availability.

As will be explained in greater detail below, embodiments of the present invention allow users to define events and associated interests and receive and send notifications upon occurrence of the associated event, based upon predetermined criteria. In particular, according to some embodiments, the translation unit 111 receives user inputs to the social networking service 107 and interfaces with or converts the data into a format compatible with the presence and availability service 106.

For example, a user could select an event associated with a common interest and select criteria on the social networking service, such as friends whose calendars are available, who are listed as present and reachable by some media, in a given area (e.g., a given zip code), and have registered the particular common interest.

Friends matching the criteria may be contacted using a medium such as e-mail, SMS, or Instant or text Messaging and invited to join the activity. In some embodiments, the message may be sent if a certain number (or more than a certain number) of friends are determined to be available at the time of the event.

In other embodiments, a user can select geographic criteria associated with a specific friend or friends. For example, if they shared an interest, the user could set a notification to be sent if the friend comes within a certain range of an event at a certain time.

Figure 2:
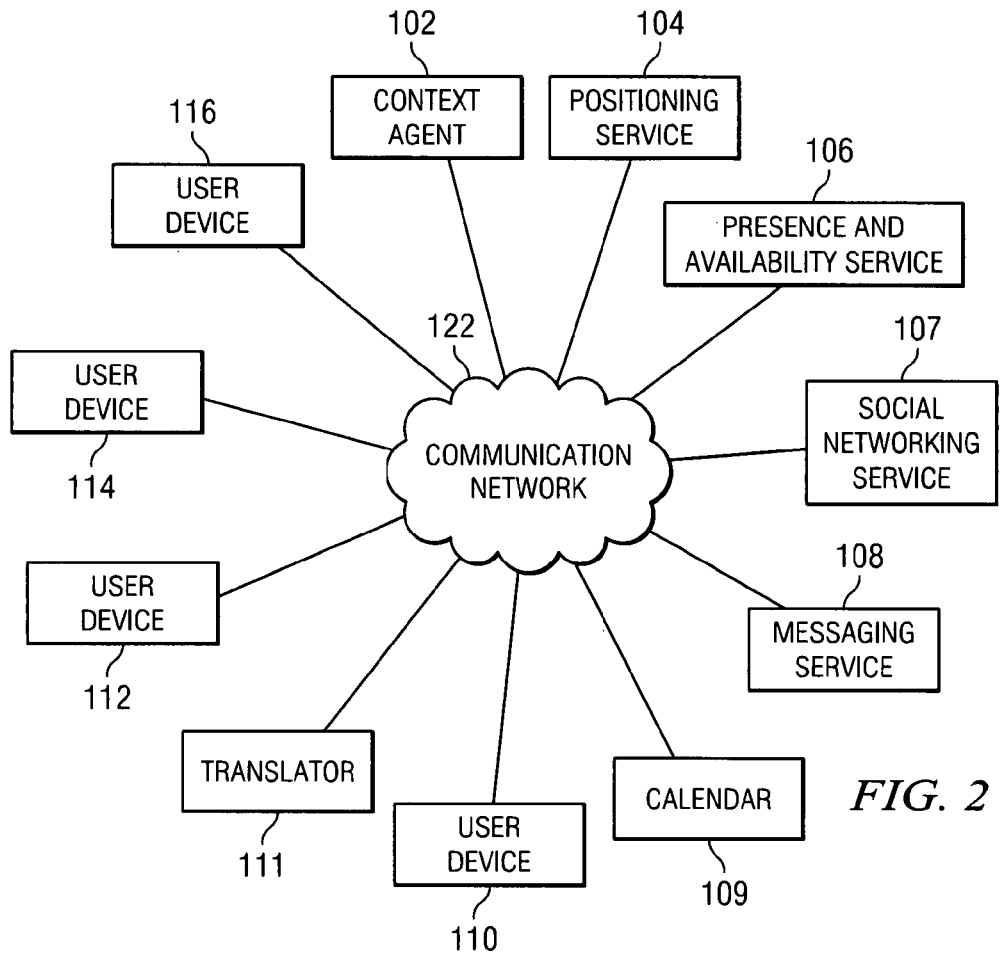
FIG. 2 illustrates an exemplary system according to an embodiment of the present invention.

In certain embodiments of the present invention, one or more of the components of the system 100 may be connected to or in communication with each other via a communication network. For example, turning now to FIG. 2, a system including the components of the system 100 is illustrated, wherein some or all of the components are in communication via a network 122. The network 122 may be or include the Internet, World Wide Web, a local area network, or some other public or private computer, cable, telephone, client/server, peer-to-peer, or communication network or intranet. In some embodiments, the communication network can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 122 may be implemented using a TCP/IP network and may implement voice or multimedia over IP using, for example, the Session Initiation Protocol (SIP).

Figure 3:
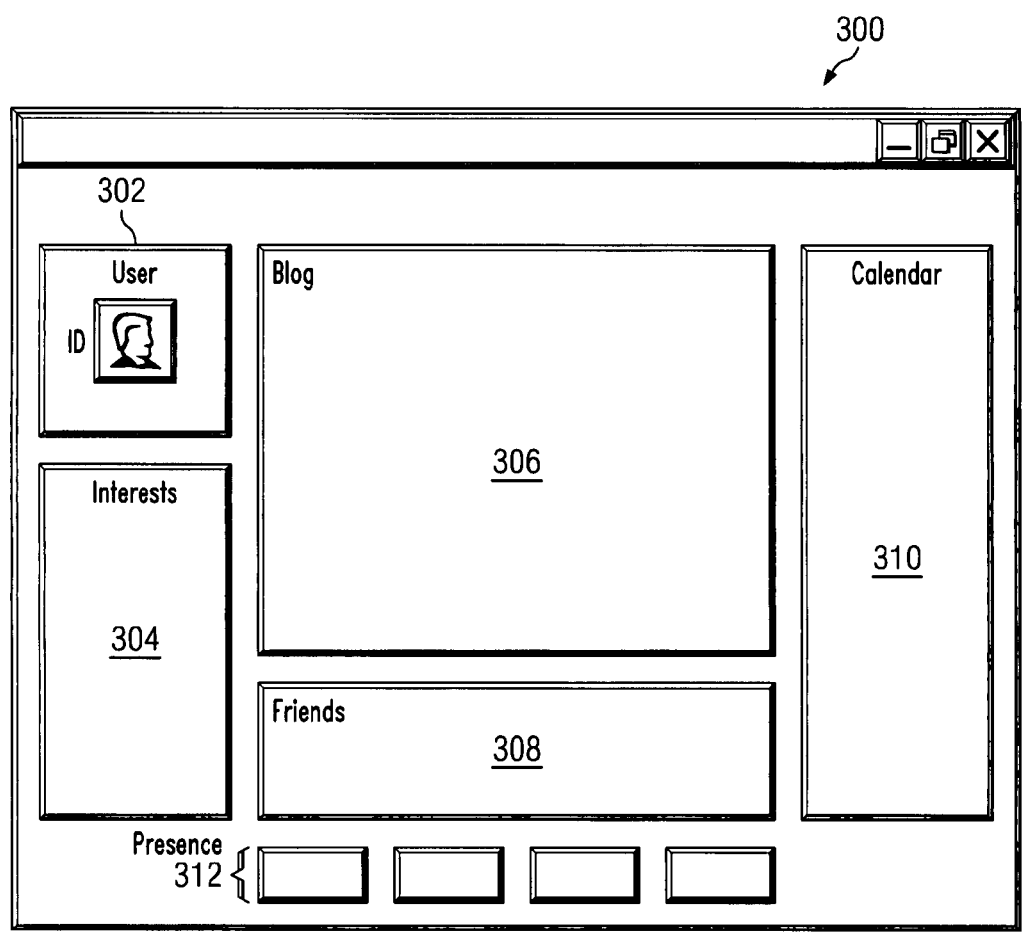
FIG. 3 is a graphical user interface according to embodiments of the present invention.

FIG. 3 is an exemplary graphical user interface 300 for communicating with a possible social networking service 107. In particular, in certain embodiments, the GUI 300 of FIG. 3 is representative of a browser-type interface of a particular user. The GUI 300 would typically be run on a personal computer or other device, such as a laptop personal computer or mobile communications device. Thus, the social networking service 107 is typically maintained on one or more servers and databases at a location remote from the user.

Shown is a user identification field 302, in which a user can enter brief biographical information and/or a photograph or icon or avatar. At 304 is a list of user interests. These could typically be entered manually or selected from a menu of pre-set interests maintained, e.g., in a database by the social networking service. In addition, in the embodiment illustrated, a blog field 306 is provided, allowing users to log in and make blog posts and/or comments. At 308 is a friends field. As will be discussed in greater detail below, the friends field lists user friends, either entered by the user himself or by other registered users with the approval of the page owner.

In addition, in some embodiments, a calendar interface 310 may be provided, for a user to view and/or select and/or set events and associate the events with particular interests. It is noted that, in some embodiments, the social network calendar interface 310 could simply be an interface that communicates with the calendar service 109. Alternatively, it could interact with a presence system calendar separate from the social network system, as well.

Finally, in some embodiments, the GUI 300 includes a presence system select field 312, which allows the user to select a presence and availability service to associate with his social networking service. For example, the presence and availability service could be an enterprise proprietary system or a public system for instant messaging and the like.

Figure 4:
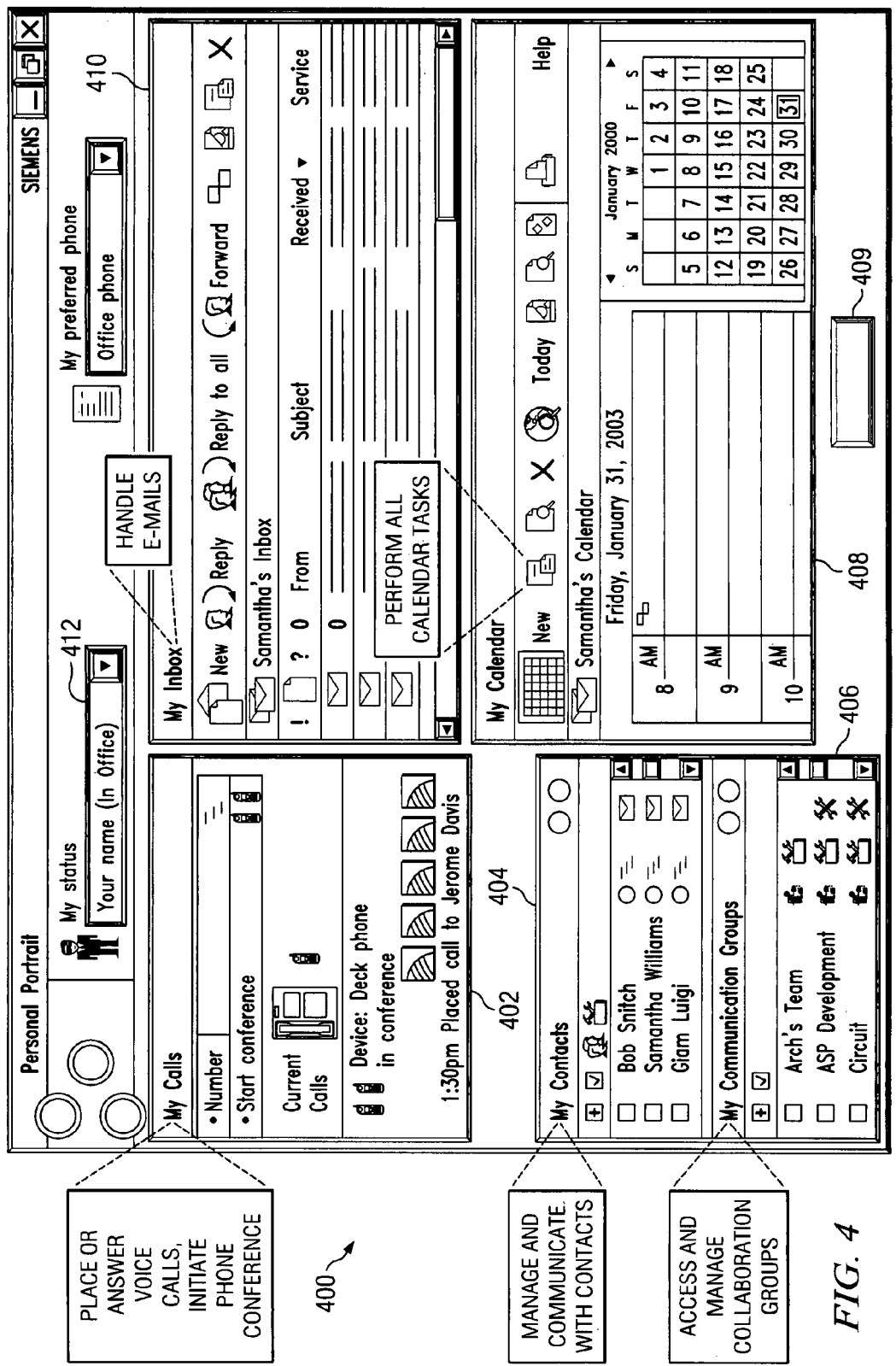
FIG. 4 is a graphical user interface according to embodiments of the present invention.

FIG. 4 illustrates a graphical user interface 400 for an exemplary presence system. In particular, the GUI 400 of FIG. 4 illustrates a browser type personal portal that may be implemented in association with an integrated messaging/presence system, such as the Openscape system, available from Siemens Corporation. Thus, the GUI personal portal 400 may be implemented as a web browser window that communicates with one or more servers and databases to provide the services described herein. The GUI 400 would typically be run on a personal computer or other device, such as a laptop personal computer or mobile communications device.

The GUI personal portal 400 may further interact with the social networking service portal 300 (FIG. 3) and allows the user to handle communication tasks associated with various applications, including, for example, handling voice calls, e-mails, and instant messages. In addition, the personal portal 400 allows the user to manage contacts and view contact status.

In particular, as shown in the embodiment illustrated, the GUI personal portal 400 includes Calls window 402, Contacts window 404, Groups window 406, Calendar 408, Inbox 410, and User Status window 412. The Calls window 402 allows, for example, the user to enter a phone number and make a call the number; show current call status; and provides a call log. The Contacts window 404 allows the user to set one or more other parties as contacts and displays current contact status, including age information and history, as will be explained in greater detail below.

The Collaboration Groups window 406 similarly allows the user to display collaboration groups and status. The calendar window interface 408 allows the user access a calendar to set times and dates, e.g., for making calls or setting meetings times. The Inbox window 410 permits receiving of e-mail or other multimedia messages. The user status window 412 allows the user to set current presence status.

In addition, as will be explained in greater detail below, a social network select field 409 may also be provided, according to some embodiments of the present invention. This can allow, for example, the presence system to interact with or select the social networking service, as will be explained in greater detail below.

Figure 5:
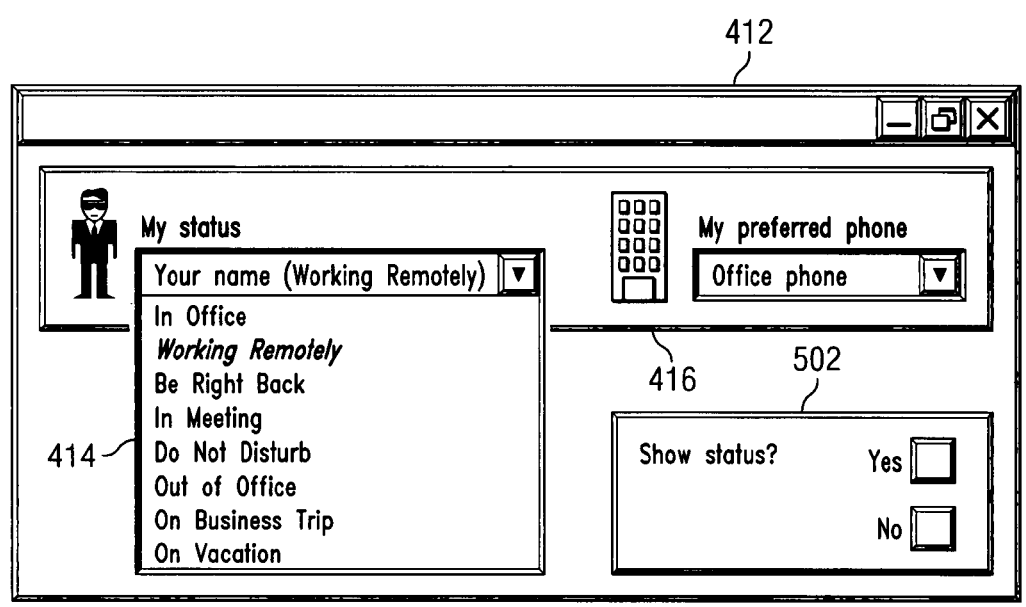
FIG. 5 is a graphical user interface according to embodiments of the present invention.

As noted above, the presence and availability system 106 and the context agent 102 function to monitor and derive a user state based on one or more monitored conditions. In addition, the user can manually set one or more contexts or status. FIG. 5 is a diagram illustrating an exemplary user status window 412. The user can use drop-down window 416 to set a preferred telephone or other communication medium. Current status can be set using drop-down 414. In the example illustrated, the user can set Current Status as In Office, Working Remotely, Be Right Back, In Meeting, Do Not Disturb, Out of Office, On Business Trip, or On Vacation. In addition, in some embodiments, at 502, he can elect whether his status and history are allowed to be shown (and to which users). Once the client makes the settings, the settings are uploaded to the associated server.

As will be discussed in greater detail below, in operation, a user may register with a social networking service 107 and a presence and availability service 106. This may include, for example, downloading the appropriate software or logging on to the appropriate web page and providing personal information for setting up accounts with the respective services. Alternatively, it can include setting up an account in one system and then using appropriate controls to automatically set up an account in the corresponding other system via the translation unit 111.

In addition, according to some embodiments of the invention, he may further download a translation interface; in other embodiments, such translation may be network based, or may be bundled with the social networking or presence software and hence transparent to the user.

He may then establish an event associated with one or more interests. This may include, for example, selecting a time and date with the calendar and picking from a list of interests using a GUI such as that of FIG. 3. The translation unit 111 translates or converts the social networking service inputs into corresponding presence system inputs. Upon an occurrence of the event, the presence system will determine availability of the user's friends/contacts. This can include determining a location of the friend/contact, whether their calendars and presence status indicate they are free, and determining if they have an associated interest. If so, then the system will cause the messaging system 108 to send a notification or alert to the particular friend/contact advising of the event.

Figure 6:
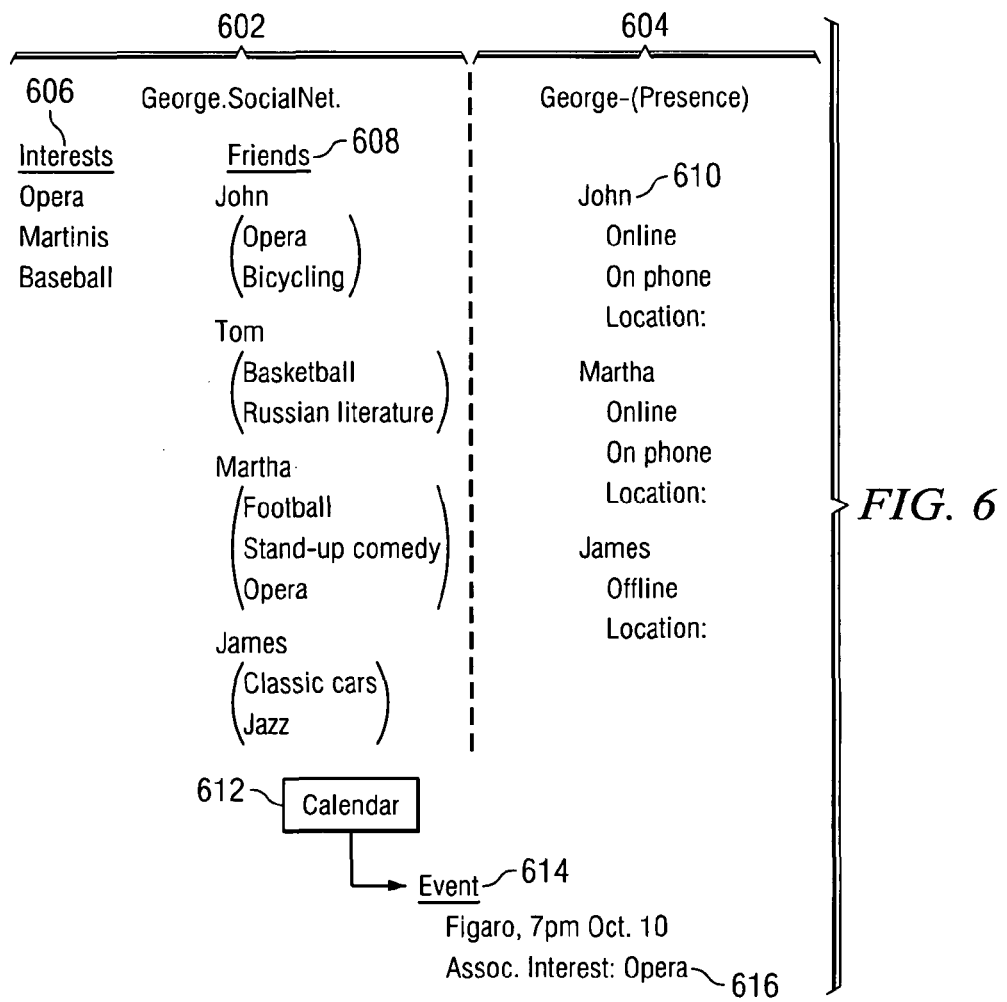
FIG. 6 schematically illustrates operation of an embodiment of the present invention.

This is illustrated schematically with reference to FIG. 6. Shown is an exemplary social networking account entry 602 and an associated presence system account entry 604 for a user "George." In the example illustrated, George has defined three interests 606, Opera, Martinis, and Baseball. George also has four "friends" 608 John, Tom, Martha, and James. It is noted that this is by way of example only; other interests and friends may be associated with a given user.

In the example shown, friend John is shown as being associated with interests Opera and Bicycling; friend Tom is associated with Basketball and Russian Literature; friend Martha is associated with interests Football; Stand-up Comedy; and Opera; and friend James is associated with Classic Cars and Jazz.

User George can also register with a presence service and provide, either automatically or manually, a list of "contacts," 610, i.e., individuals whose presence and/or location is to be tracked and monitored. Alternatively, the user George can activate his translation unit 111, for example, by selecting the appropriate presence service on his GUI 300, and the entries from the social networking service will be uploaded to corresponding entries in the presence service. In the example illustrated, George has contacts John, Martha, and James in the presence system. Also in the presence system, John has a context of "Online" and "On phone," while Martha has contexts of "Online" and "On phone." James, however, has context "Offline." In addition, each of the contacts may be associated with a Location.

User George may also be provided with a calendar 612, in which he can identify particular events 614 and associate interests 616. As discussed above, this can include using an interface to access the network calendar, which can be accessed by the social networking and presence and availability services.

As will be explained in greater detail below, user George can select or define an event and associated interests using calendar 612. For example, he can define an event 614 for an upcoming performance of The Marriage of Figaro and associate interests 616, such as "Opera" with the upcoming performance. For example, he may select from a database of events or may enter the details of the event manually. The social networking service 107 can then perform a database search for user George's friends who have registered the same interest.

Once such friends are found, the social networking service 107 communicates the results to the presence and availability service 106, typically via the translator interface 111. The presence and availability service 107 can then, in association with the context agent, determine their current presence context, typically when the event is imminent, although early notice may also or alternatively be provided. For example, the system can determine that user John and user Martha, who have expressed interest in Opera, are online. The system will then cause the messaging system 108 to send them an appropriate message regarding the upcoming event. In certain embodiments, the presence context can also take into account the contact's location, i.e., proximity to the event, or his own calendar. For example, even if the user has expressed an interest, if he is out of state or on vacation at the time of the event he will not need to receive notice.

In alternate embodiments, the user George can simply define interests and have the system search a database (not shown) and find related events for him, either automatically or in response to a manual search initiation. For example, he can search a database for "Opera." The social networking service can determine, for example, that there is an upcoming performance of The Marriage of Figaro and provide the user with the date, time, location, etc. Once the user selects a particular performance, the system can seek out the user's friends who have expressed similar interests, in a manner similar to that set forth above.

In still other embodiments, the user George can specify individual parties who share same interests and have the system send them messages when an event is upcoming and they are available and in proximity.

As noted above, aspects of the present invention relate to communicating and coordinating friend and contact information between unrelated social network and presence systems. This may be accomplished using a translator interface 111, which may be implemented to function in a variety of ways.

Figure 7:
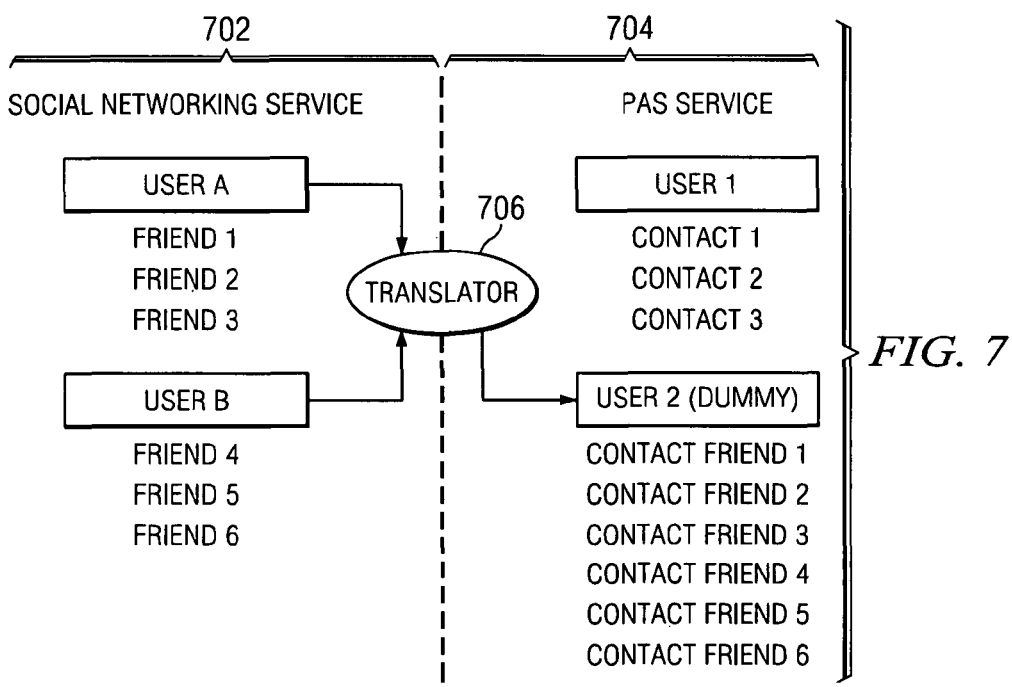
FIG. 7 illustrates exemplary translation unit operation according to an embodiment of the present invention.

For example, shown in FIG. 7 is one such method for doing so. In such an embodiment, the users in the social networking service 702 are collectively deemed a "dummy" user in the presence system 704. The presence system 704 then monitors the states of the parties registered as contacts to the "dummy" user. Thus, for example, the translator interface 111 provides the user information from the various social networking service users to the presence and availability service 106 in a compatible format.

For example, shown are an exemplary User A and User B in the social networking service 702. User A has friends 1, 2, and 3; user B has friends 4, 5, and 6.

Correspondingly, the presence system 704 has a User 1 with contacts 1, 2, and 3. In this example, the presence system 704 registers all users from the social networking service as a dummy user 2 via translation interface 706.

Thus, all the friends of User A and User B in the social networking service 702 are deemed contacts of the User 2 in the presence system 704. When the context agent (FIG. 1) determines the appropriate contexts for the contacts, the information may be returned to the social networking service 702, again via the translation interface 111. For example, the social networking service or the translation interface 111 may keep track of the fact that any reported information on Contact 1, 2, and 3 goes to User A.

Figure 8:
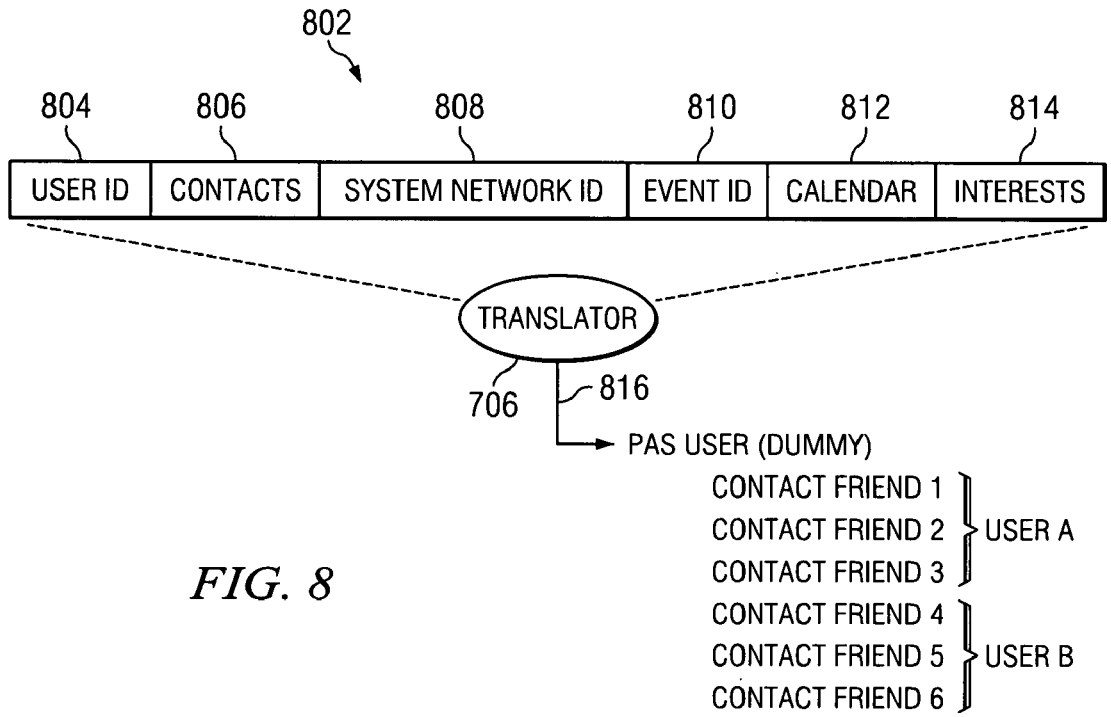
FIG. 8 illustrates an exemplary protocol element according to an embodiment of the present invention.

This is illustrated more particularly with reference to FIG. 8. In particular, shown in FIG. 8 is an exemplary protocol element 802 that may be used to communicate between the social networking service and the presence system. Also shown is a "translator" 802 that may be used to translate between information provided by the social networking service and the presence service.

The protocol element 802 can include an identifier 804, a contacts list 806, system or network identification 808, and event ID 810, as well as calendar field 812, interests 814, and additional information. It is noted that, in a particular implementation or communication, not all the fields are necessarily filled. Thus, the protocol element is exemplary only.

In operation, the translator 706 receives the communication from the social networking service 107 as shown schematically at 816. More particularly, at 816, the translator 702 translates the received user ID into a corresponding set of information for the presence service. In the embodiment illustrated, the translator 702 thus defines each incoming user as a dummy user on the PAS system 106 and maintains a database of social network users and their friends, who become a single user on the PAS system 106, with multiple contacts corresponding to each of the friends.

The PAS service 106 receives the "dummy" information and treats the contacts as it would any "internal" contacts. The "event" identification and interests can likewise be received by the translator 702 and translated into corresponding information readable by the PAS service 106 or an associated calendar.

In some embodiments, the social networking service 107 may maintain at least a rudimentary presence display function, i.e., showing only when a party is online. In this case, the translation unit 111 receives the presence information from the PAS service 106 and translates the information back into social networking service format.

Figure 9:
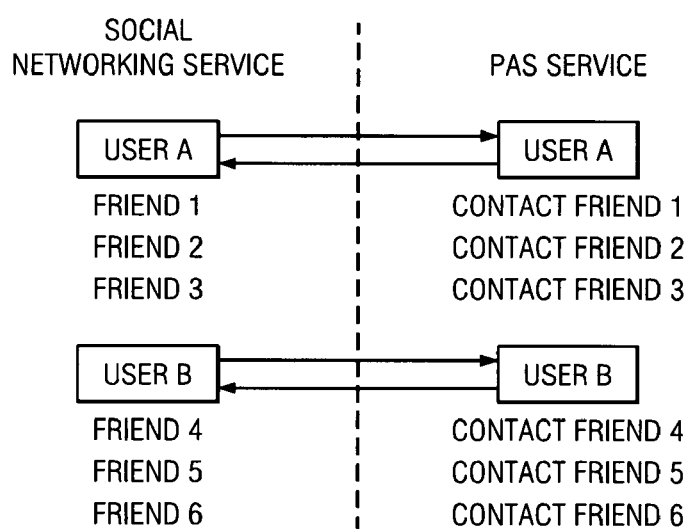
FIG. 9 illustrates exemplary translation unit operation according to an embodiment of the present invention.

In an alternate embodiment, the users in the social networking service 107 are duplicated as users in the PAS system 106. That is, they are uploaded to and treated as independent users in the PAS system 106; the entries in the social networking service 107 are thus essentially the same as the entries in the PAS system 106. This is illustrated schematically in FIG. 9. Shown in the social networking service 902 are User A and User B. User A has friends 1, 2, and 3; and User B has friends 4, 5, and 6. User A and User B can register with the remote presence system 904 as users, such that their "friends" are contacts for purposes of the PAS system 106. In such an embodiment, the PAS system 106 includes one or more control units to maintain a database of which users are associated with the remote social networking service 107. Otherwise, they are treated as local parties.

Figure 10:
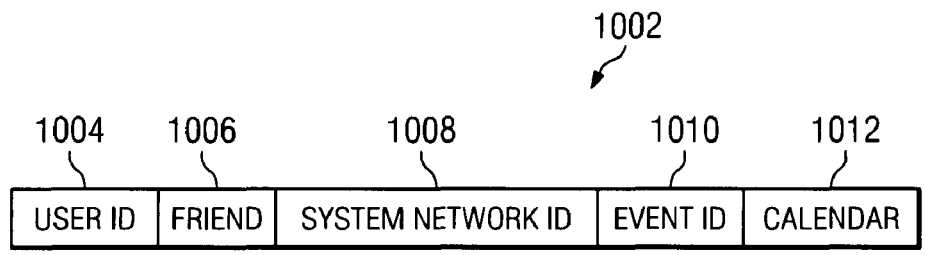
FIG. 10 illustrates an exemplary protocol element according to an embodiment of the present invention.

This is illustrated more particularly with reference to FIG. 10. In particular, shown in FIG. 10 is an exemplary protocol element 1002 that may be used to communicate between the social networking service 107 and the PAS system 106. A "translator" such as translator unit 111 may be used to translate between information provided by the social networking service 107 and the presence service 106.

The protocol element includes an identifier 1004, a contacts list 1006, system or network identification 1008, and event id 1010, as well as additional information 1012. It is noted that, in a particular implementation or communication, not all the fields are necessarily filled. Thus, the protocol element is exemplary only.

In this embodiment, the translator serves to convert the information from the one system format to the other; and can maintain a database of the "mappings."

Figure 11:
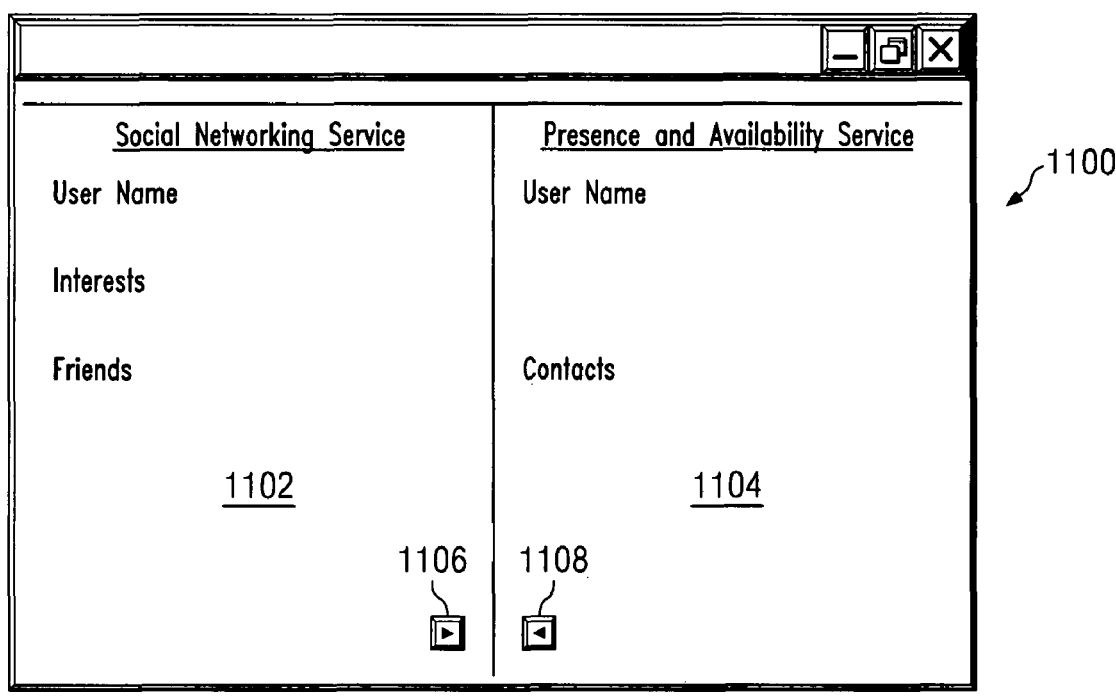
FIG. 11 illustrates an exemplary translation user interface according to embodiments of the present invention.

According to some embodiments, the translator unit 111 includes or implements a utility that allows users to control aspects of the interfacing between the social networking service 107 and the presence and availability service 106. For example, FIG. 11 illustrates a GUI 1100 for such a utility. As shown, the GUI 1100 includes a social networking service window or side 1102 and a presence and availability service window or side 1104.

In addition, the social networking service side 1102 can include a transfer control 1106; likewise the presence and availability service side can include a transfer control 1108.

The social networking service side 1102 can receive user name, interests, and friends entries from the social networking service 107. The presence and availability service side can receive user name, and contacts information from the presence and availability service 106.

In operation, when the utility receives the information from one of the services, the user can manually select to transfer the information to the other.

Figure 12:
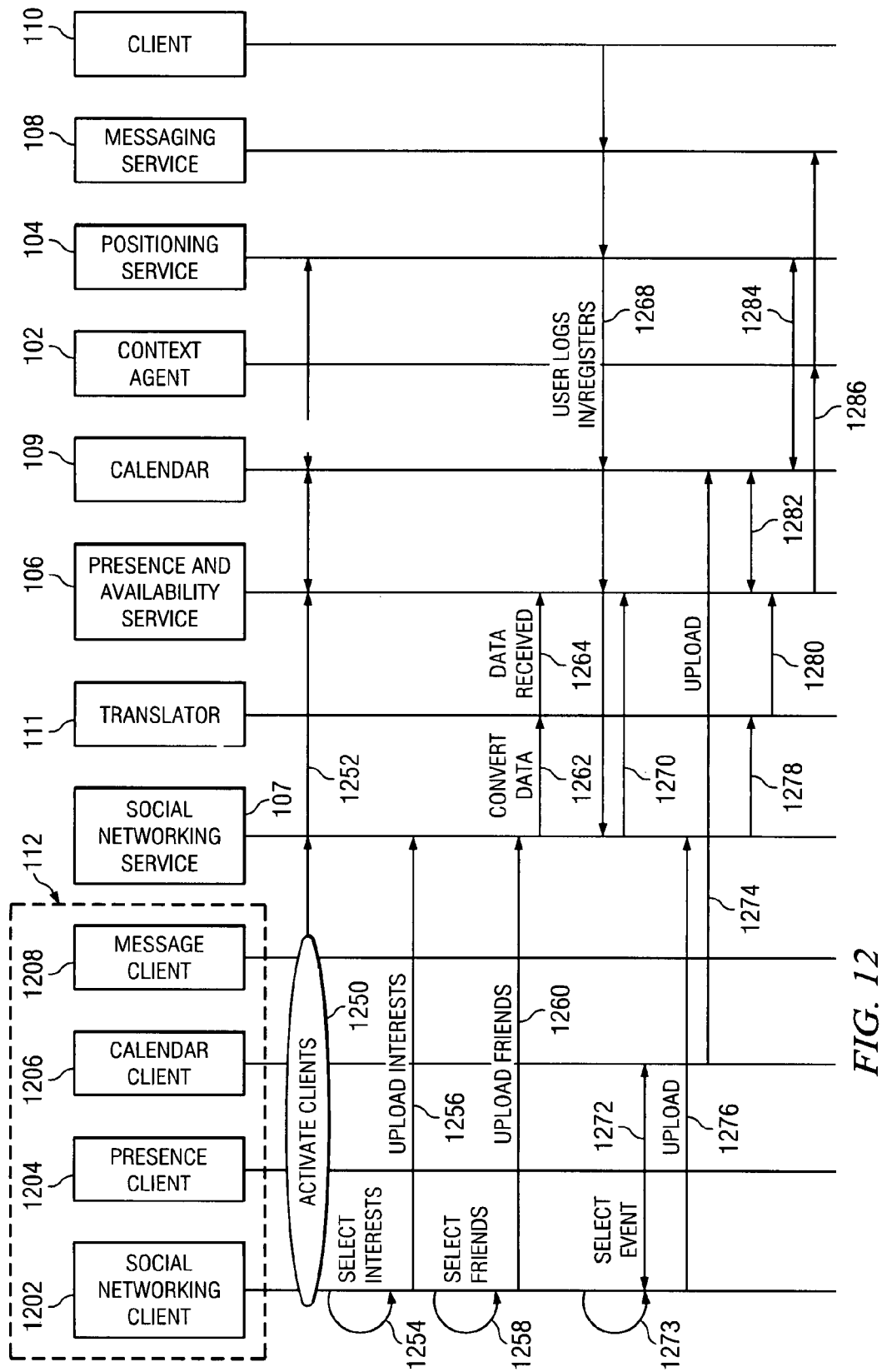
FIG. 12 illustrates exemplary operation of an embodiment of the present invention.

Turning now to FIG. 12, a diagram illustrating communication among various system entities is shown. Shown are a client 112 including a social networking client 1202, a presence client 1204, a calendar client 1206, and a messaging client 1208; social networking service 107; translation unit 111; PAS 106; calendar service 109; context agent 102; positioning service 104; messaging service 108; and another client 110. For sake of convenience, the individual clients applications are omitted from client 110.

In operation, a user 112 can activate his various clients, which are typically implemented as browser or similar client windows, such as discussed above, and as shown at 1250. The clients can then log in to their appropriate services at 1252. Again, this typically would include navigating to the appropriate web page and logging in as appropriate. In some embodiments, logging in to the social networking service can automatically cause a logging in to the corresponding PAS 106, via the translation unit 111.

At 1254, the user 112 can use his social networking client 1202 to select one or more interests. These are then uploaded to the social networking service 107, at 1156. At 1258, the user 107 can use his social networking client 1202 to upload one or more friends, which are then added to the social networking service at 1260. Typically, uploading friends can include receiving e-mail or other messages from other social network clients who wish to become friends. If the recipient accepts such parties as friends, they can be added.

At 1262, the translation unit 111 can receive the social networking service 107 information for the client 1202 and convert the friend data, etc., into presence system information. This can include, for example, accessing and maintaining suitable user databases (not shown) and converting friends into contacts, and the like. At 1264, the information is received at the presence and availability system 106.

Client 114 can similarly log in and/or register to his various services, at 1268, including, for example, uploading interests, friends, and contacts. He can also enter contact information and calendar information, at 1270 as well as present status. In some embodiments, clients may also designate security levels, such as whether other parties can have access to their calendars and lists of interests, etc. At 1270, the data are converted and received.

Using the social networking client 1202, the user can pick an event at 1272. As discussed above, this can include the user picking an event from a calendar or defining an event manually, including time, date, nature, and topic, for example. The event may further be associated or cross-referenced with one of the interests defined by the user at 1273. For example, the social networking service may keep a database listing events with an event type and associated interests.

The event information may be received at the calendar client 1206 and uploaded to the calendar service 109, at 1274 and social networking service at 1276. The event information can be received at the translation unit 111 at 1278. When the event occurs, or at another predetermined time, the social networking service 107, which received the event information, can then search its database for those members who are friends of the user and who have expressed an interest in events having similar interests. The identities of these parties can then be passed to the presence and availability system 106, via the translation unit 111 at 1280.

When the event occurs, or at another predetermined time, the translation unit 111 or the calendar service 109 at 1282 can cause the presence and availability service 106 to perform a presence check for the party who set the event.

This can involve, for example, the system determining that a predetermined number of contacts are within a predetermined distance of the event, i.e., in the same zip code or within a particular radius or the like, using the positioning service 104 at 1284. It may also include the PAS 106 accessing the calendar service 109 at 1282 for the calendars of parties who allowed such access to determine if there are no conflicting events for those users.

Alternatively, as noted above, the user can select individual users using his social networking client 1202 who have a particular interest. The social networking service 107 can access a database for events that correspond to the particular interest. When the event occurs, or at another predetermined time, the translation unit 111 can receive the user and event information and perform a presence check, in a manner similar to that discussed above.

If other parties are available, the presence and availability service 106 causes the messaging service 108 to send a message to the corresponding users. The context agent 102 can update the user contexts at this time, as well, at 1286.

Turning now to FIG. 13, a flowchart 1300 illustrating operation of embodiment of the present invention is shown. The particular arrangement of elements in the flowchart 1300 is not meant to imply a fixed order to the elements; embodiments can be practiced in any order that is practicable.

In a step 1302, a user can register with a social networking service 107. This can include, for example, establishing an account and defining friends and interests via a web browser type interface. In a step 1304, the user can select a presence service 106. This can include, for example, the user selecting one or more controls on a social networking service user interface, as discussed above. Alternatively, the social networking service 107 and/or the translation unit 111 can "search" for a presence service 106 which the user is already registered to. In a step 1306, the presence service 106 and the social networking service 107 interoperate to translate and determine the overlap, if any, of friends in the social networking service 107 and contacts in the presence service 106. It is noted that, in other embodiments, the social networking service may be selected from the presence and availability service.

Turning now to FIG. 14, a flowchart 1400 illustrating operation of embodiment of the present invention is shown. The particular arrangement of elements in the flowchart 1400 is not meant to imply a fixed order to the elements; embodiments can be practiced in any order that is practicable.

In a step 1402, a user may define an event using his social networking service or other associated calendar. In a step 1404, interests or friends may be associated with the event. As noted above, this may occur automatically by the system or manually entered by the user.

In a step 1406, the user can define presence notification criteria. As discussed above, this can include the user selecting individuals for notification if they are within a predetermined distance of an event within a predetermined time of the event; or may include predetermined parties being available at the time of the event; or parties having matching interests being notified when they are free and/or within a predetermined distance of the event; and the like.

In a step 1408, the event and criteria are received by the presence and availability service 106, after being suitably converted by the translation unit 111. In a step 1410, the event is detected. As noted above, this can be detected the event a predetermined period before it actually occurs. In some embodiments, the calendar 109 can notify the presence system 106 that it should perform a presence check. In a step 1410, the presence and availability system 106 determines if the event-related criteria match. This can include, for example, receiving positioning information from the positioning service. In a step 1412, the messaging service 108 sends a suitable message or messages to the parties whose criteria match.

Now referring to FIG. 15, a representative block diagram of a computer or processing device 1500 suitable for use as a user device or server according to embodiments of the present invention is shown. In particular, the computer 1500 may be a device suitable for setting one or more presence states of the user and may be implement a client device such as those shown in FIG. 1, 2. In some embodiments, the computer 1500 may include or operate a control program 1512. In client embodiments, the control program 1512 may implement a social networking client, calendar client, messaging client, and presence client. In server embodiments, the computer can implement a social networking service, presence service, context agent, messaging service, positioning service, and translation interface. The computer 1500 may be embodied as a single device or computer, a networked set or group of devices or computers, a workstation, mainframe or host computer, etc. In some embodiments, the computer 1500 may implement one or more elements of the methods disclosed herein.

The computer 1500 may include a processor, microchip, central processing unit, or computer 1502 that is in communication with or otherwise uses or includes one or more communication ports or network interfaces 1504 for communicating with user devices and/or other devices. The communication ports 1504 may include such things as local area network adapters, wireless communication devices, Bluetooth technology, etc. The computer 1500 also may include an internal clock element 1506 to maintain an accurate time and date for the computer 1500, create time stamps for communications received or sent by the computer 1500, etc.

If desired, the computer 1500 may include one or more output devices 1508 such as a printer, infrared or other transmitter, antenna, audio speaker, display screen or monitor, text to speech converter, etc., as well as one or more input devices 1510 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the computer 1500 may include a memory or data storage device 1512 to store information, software, databases, documents, communications, device drivers, etc. The memory or data storage device 1512 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. Thus, the storage device 1512 may include various combinations of moveable and fixed storage. The computer 1500 also may include memory 1514, such as ROM 1516 and RAM 15115.

The processor 1502 and the data storage device 1512 in the computer 1500 each may be, for example: (i) located entirely within a single computer or other computing device; or (ii) connected to each other by a remote communication medium, such as a serial port cable, telephone line or radio frequency transceiver. In one embodiment, the computer 1500 may be implemented as one or more computers that are connected to a remote server computer, as will be explained in greater detail below.

A conventional personal computer or workstation with sufficient memory and processing capability may be used as the computer 1500. The computer 1500 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 1502. Other suitable processors may be available from Motorola, Inc., AMD, or Sun Microsystems, Inc. The processor 1502 also may be embodied as one or more microprocessors, computers, computer systems, etc.

Software may be resident and operating or operational on the computer 1500. The software may be stored on the data storage device 1512 and may include a control program 1522 for operating the computer and, in particular, implementing various of the functions discussed above.

The client control program 1522 may control the processor 1502. The processor 1502 may perform instructions of the client control program 1520, and thereby operate in accordance with the methods described in detail herein. The client control program 1522 may be stored in a compressed, uncompiled and/or encrypted format. The client control program 1522 furthermore includes program elements that may be necessary, such as an operating system, a database management system and device drivers for allowing the processor 1502 to interface with peripheral devices, databases, etc. Appropriate program elements are known to those skilled in the art, and need not be described in detail herein.

The computer 1500 also may include or store user information 1524, such as information regarding identities, user devices, contexts, presence information, communications, etc. This information may also include audio files downloadable to the cellular telephone for use as ringer tones. Information regarding other application program data may be stored in application databases (not shown)

According to some embodiments, the instructions of the control program may be read into a main memory from another computer-readable medium, such as from the ROM 1516 to the RAM 15115. Execution of sequences of the instructions in the control program causes the processor 1502 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 1502, communication ports 1504, clock 1506, output device 1508, input device 1510, data storage device 1512, ROM 1516 and RAM 15115 may communicate or be connected directly or indirectly in a variety of ways. For example, the processor 1502, communication ports 1504, clock 1506, output device 1508, input device 1510, data storage device 1512, ROM 1516 and RAM 15115 may be connected via a bus 1534.

While specific implementations and hardware/software configurations for the computer 1500 have been illustrated, it should be noted that other implementations and hardware configurations are possible and that no specific implementation or hardware/software configuration is needed. Thus, not all of the components illustrated in FIG. 15 may be needed for the computer 1500 implementing the methods disclosed herein.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures (Eighth Edition, August 2001 as revised October 2005), Section 2111.03.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

What is claimed is:

1. A telecommunications system, comprising:
a telecommunication network;
a plurality of telecommunication devices connected to and communicating through said telecommunication network, each of said plurality of telecommunication devices identified with a respective registered telecommunication system user;
a social networking service operably coupled to the telecommunication network, the registered users of the telecommunication devices being registered with the social networking service, each of the registered users of the telecommunication device having user information accessible via the social networking service that identify that user's registered interests and identify associated users, the associated users being comprised of other social networking service users associated with the registered telecommunication system user that are also registered telecommunication system users;
a presence and availability service (PAS) operably coupled to the telecommunication network and said plurality of telecommunication devices, said PAS determining an availability of the associated users that match availability criteria, the availability criteria comprising being present within a predetermined amount of time of an event, being located within a predetermined distance of the event, and having prescribed implied availability information;
a calendar service, the registered telecommunication system users of the telecommunication devices registered with the calendar service and having events scheduled via the calendar service, the scheduled events being communicated to the PAS such that the PAS accesses the scheduled events to determine the availability of the associated users;
a positioning service identifying a present location of the users of the telecommunication devices and communicating the present location of the users of the telecommunication devices to the PAS;
a context agent monitoring implied availability information of the associated users and communicating the implied availability information of the associated users to the PAS;
a translation unit configured to convert the user information from a social networking service format of the social networking service to a presence and availability service format of the presence and availability service;
a messaging service operably coupled to the telecommunication network and said plurality of telecommunication devices, said PAS communicating with and causing said messaging service to send notification messages, said messaging service sending said notification messages to the associated users determined to be available and having a common interest corresponding to the event and responsive to an occurrence of the event and matching the availability criteria;
the PAS determining the availability of the associated users by communicating with the social networking service and the calendar service to determine which of the associated users are available within the predetermined amount of time of the event, by communicating with the positioning service to determine which of the associated users is within the predetermined distance of the event, and also by communicating with the context agent to determine which of the associated users have the prescribed implied availability information.

2. The telecommunications system of claim 1, wherein the translation unit is a network-based translation unit.

3. The telecommunications system of claim 1, wherein the translation unit is configured such that the respective registered telecommunication system user can manually select the user information that is converted from a social networking service format of the social networking service to a presence and availability service format of the presence and availability service.

4. The telecommunications system of claim 1, wherein the translation unit is configured to convert user information from a social networking service into dummy telecommunication system user information in the PAS.

5. The telecommunications system of claim 1, wherein the translation unit is configured to convert a user entry from a social networking service into a user entry in the presence and availability service.

6. The telecommunications system of claim 1 wherein said positioning service includes a global positioning system for determining a location of said associated users.

7. The telecommunications system of claim 6, wherein the availability criteria include one or more geographic criteria.

8. The telecommunications system of claim 1, wherein said PAS communicates with said messaging service over said telecommunication network and the availability criteria are user input criteria.

9. The telecommunications system of claim 1, wherein said messaging service comprises a text messaging service.

10. The telecommunications system of claim 1, wherein said messaging service comprises an e-mail service.

11. The telecommunications system of claim 1, wherein the messaging services sends a notification message when a predetermined number of the associated users are determined to be available.

12. The telecommunications system of claim 1, wherein the calendar service is configured to communicate with the context agent to update the implied availability information of the associated users.

13. The telecommunications system of claim 1 wherein availability of each of the associated users is also determined as being available by the PAS communicating with the social networking service and receiving user information showing that the associated user is present and reachable.

14. A telecommunications method, comprising:
selecting an event by a selecting user for which availability of at least one associated user is to be determined on a social network system, the event being related to an interest of the selecting user, the selecting user and the at least one associated user being registered with the social network system, having a common interest corresponding to the event, having user information accessible via the social network system, and being identified with at least one telecommunication device that connects to and communicates through a telecommunication network, the telecommunication network being coupled to a presence and availability service (PAS) operated on at least one computer device connected to the telecommunication network, a calendar service, a positioning service, a context agent, and a messaging service;
selecting availability criteria on the PAS, the availability criteria comprising being present within a predetermined amount of time of the event, being located within a predetermined distance of the event, and having prescribed implied availability information;
interfacing the social networking system over said telecommunication network to the PAS, such that the PAS determines the at least one associated user that shares the interest of the selecting user and meets the selected availability criteria, comprising:

the PAS accessing the calendar service of the at least one associated user and comparing the availability criteria to scheduled events that are scheduled via the calendar service, the positioning service indentifying a present location of the at least one associated user and communicating the present location of the at least one associated user to the PAS, the PAS comparing the present location of the at least one associated user to the availability criteria, and the context agent identifying implied availability information of the at least one associated user and communicating the implied availability information to the PAS; and the messaging service transmitting a notification message to the at least one telecommunication device identifying the determined at least one associated user, the notification message being transmitted responsive to the at least one associated user determined to meet the availability criteria by the PAS.

15. The telecommunications method of claim 14, wherein said PAS communicates with said messaging service over said telecommunication network and the availability criteria further comprises time criteria.

16. The telecommunications method of claim 14, wherein the availability criteria further comprises location criteria, and said PAS resides in a presence server connected to said messaging service, said PAS communicating with said messaging service.

17. The telecommunications method of claim 14, wherein the event comprises an Internet conferencing-type event.

18. The telecommunications method of claim 14, wherein the event comprises a geographic event.

19. The telecommunications method of claim 14, wherein the notification message comprises a text message.

20. The telecommunications method of claim 14, wherein the notification message comprises an e-mail message.

* * * * *